(12) United States Patent
Winterowd et al.

(10) Patent No.: US 9,518,185 B2
(45) Date of Patent: Dec. 13, 2016

(54) BONDING RESIN FOR WOOD-BASED COMPOSITES PROVIDING LIGHT COLORING, LOW PLATEN STICKING, AND WATER RESISTANCE

(71) Applicant: WEYERHAEUSER NR COMPANY, Federal Way, WA (US)

(72) Inventors: Jack G. Winterowd, Puyallup, WA (US); Erik M. Parker, Federal Way, WA (US)

(73) Assignee: Weyerhaeuser NR Company, Seattle, WA (US)

( * ) Notice: Subject to any disclaimer, the term of this patent is extended or adjusted under 35 U.S.C. 154(b) by 0 days.

(21) Appl. No.: 14/338,606

(22) Filed: Jul. 23, 2014

(65) Prior Publication Data
US 2016/0024354 A1    Jan. 28, 2016

(51) Int. Cl.
| | | |
|---|---|---|
| *C08L 97/02* | (2006.01) | |
| *B32B 21/02* | (2006.01) | |
| *B32B 7/12* | (2006.01) | |
| *B32B 21/04* | (2006.01) | |
| *C08L 75/04* | (2006.01) | |

(52) U.S. Cl.
CPC .............. *C08L 97/02* (2013.01); *B32B 7/12* (2013.01); *B32B 21/02* (2013.01); *B32B 21/042* (2013.01); *C08L 75/04* (2013.01); *B32B 2255/08* (2013.01); *B32B 2255/26* (2013.01); *B32B 2317/16* (2013.01); *B32B 2375/00* (2013.01); *B32B 2379/00* (2013.01); *B32B 2419/04* (2013.01); *B32B 2419/06* (2013.01)

(58) Field of Classification Search
CPC ......... C09J 161/32; C08L 97/02; C08L 75/04; C08L 75/00; B32B 21/02; B32B 7/12; B32B 21/042

See application file for complete search history.

(56) References Cited

U.S. PATENT DOCUMENTS

| | | | |
|---|---|---|---|
| 7,640,664 B1 * | 1/2010 | Bailey | B27N 3/04 29/897.32 |
| 2010/0071829 A1 | 3/2010 | Tanzer | |
| 2010/0075153 A1 | 3/2010 | Ni | |
| 2012/0202041 A1 * | 8/2012 | Kasmayr | B32B 21/02 428/313.5 |

FOREIGN PATENT DOCUMENTS

WO    0138416 A1    5/2001

OTHER PUBLICATIONS

Hexion Specialy Chemicals Material Data Safety Sheet Casco-Resin MUF M08PC-T and MUF M20 PC-T. Feb. 1, 2008.*

* cited by examiner

*Primary Examiner* — John Uselding
(74) *Attorney, Agent, or Firm* — Perkins Coie LLP

(57) ABSTRACT

Disclosed herein are adhesives, wood-based composites incorporating the adhesives, and methods of forming wood-based composites using the adhesives. In some embodiments, an adhesive emulsion includes a continuous phase having an aqueous, alkaline solution that includes a melamine/urea/formaldehyde ("MUF") resin, and a dispersed phase that includes a multifunctional aromatic isocyanate component. The solution including the MUF resin has a percent solids content of about 1.0% to about 90.0%, and the MUF resin and the multifunctional aromatic isocyanate component are present in a ratio of about 92:8 to about 40:60 on a solids mass basis. Wood-based composites formed using the adhesives demonstrate an optimal combination of characteristics desirable to the wood products industry.

21 Claims, 1 Drawing Sheet

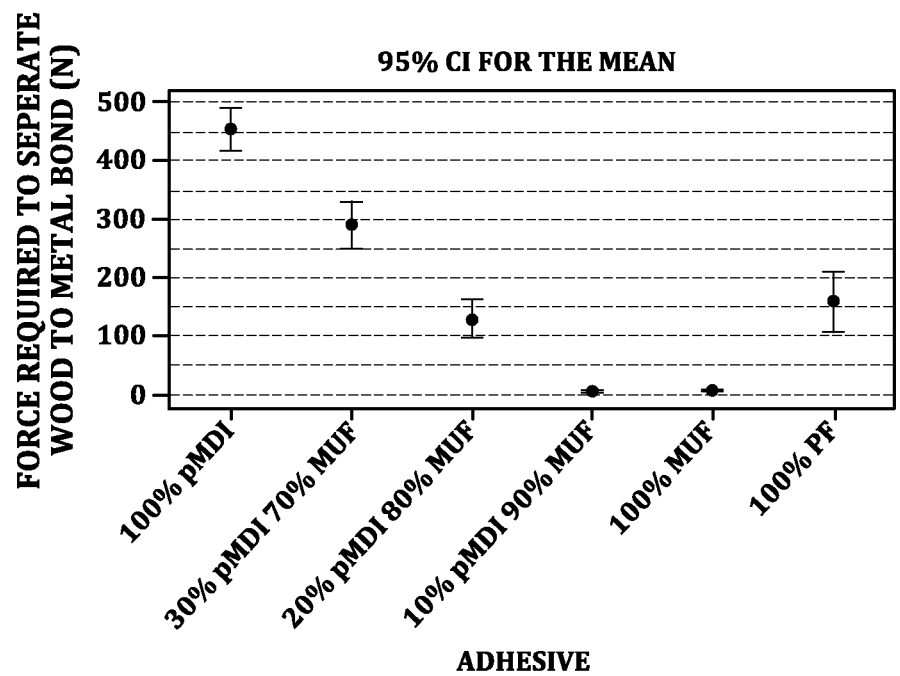

BONDING RESIN FOR WOOD-BASED COMPOSITES PROVIDING LIGHT COLORING, LOW PLATEN STICKING, AND WATER RESISTANCE

BACKGROUND

Wood-based composites are widely used in North America in both structural and non-structural applications. Structural applications include use of these materials for framing and sheathing (floors, walls and roofs) in residential construction. One of the most common composites used for these applications is oriented strandboard (OSB).

OSB is typically manufactured in seven major stages, which include stranding, screening, drying, blending, forming, pressing, and finishing. Stranding is a process in which logs are cut into discrete wooden strands (also known as flakes) that typically have an aspect ratio between 1 and 20. The long axis of the strands is predominantly aligned within about 0-30° of the grain of the wood. The strand thickness can range from about 0.015" to about 0.050" and the length can range from about 1" to about 12", or even longer. In most cases, it is advantageous to cut strands from wood that has a relatively high moisture content, such as 30-200%. Thus, the stranding process almost always yields wet strands that must be dried prior to further processing. Drying is usually accomplished by passing the wet strands through long rotating drums or pipes in conjunction with hot, dry air. Alternatively, strands can be dried by conveying them in a chamber with hot, dry air passing through or around the conveyance system. The drying process commonly results in strands that have a moisture content of about 1-7%. The resulting dried strands exist as a mixture of relatively large and small elements, and it is frequently desirable to screen the material in order to separate the strands on the basis of size. In many cases the smallest wooden particles, known as fines, are diverted from the product stream and are transported to a burner where they are used as fuel. The acceptable wooden strands are then metered into large rotating drums, known as blenders, and are sprayed or otherwise mixed with bonding resin (adhesive) and wax. This stage is known as blending. Many blenders rotate at a rate of about 4-20 rpm and are tilted)(3-8° in order to promote material flow. A single blender can have about six liquid application devices distributed within it. Such application devices are frequently rotary disk atomizers, but they can also be simple spray guns. In some cases one of the application devices is devoted to wax and five of the application devices are devoted to resin. Powdered bonding resins can also be introduced into the blender. It is common for large strands and small strands to be blended separately. Strands that have been treated with bonding resin and wax are then formed into a mat. Treated strands are formed into a mat by dispensing them at some controlled rate through mechanical partitions that tend to align the strands in a particular orientation. As the strands pass through the alignment devices they are collected onto a continuous conveyor belt. Frequently, the strands incorporated into the top and bottom layers of an OSB mat are larger than the strands incorporated into the core (or middle) layer of the mat. In many cases the bonding resins and application levels used in the surface layers of an OSB mat are different than those used in the core layer of the mat. In a commercial manufacturing process the mat is generally continuous in length and has a width of between about 4' and 16'. The thickness of the mat can be in the range of about 2" to 20". In some cases the continuous mat of treated strands is transported directly into a continuous hot-press, but in most cases the mat is cut into discrete sections, which commonly have a length of about 8' to 20'. These mat sections are loaded into a multi-opening hot press, which can usually press between 12 and 20 mats simultaneously. During the process of pressing strands are forced together and intimate contact is achieved along their interface. Subsequent to this consolidation process bond formation occurs as the resin undergoes curing reactions and is converted from a liquid to a load-bearing solid. The press then opens and the relatively large "jumbo" panels are ejected onto a conveyor and transported to the finishing stages of the operation. Finishing steps commonly include cutting the jumbo panels into smaller panels, such as those having dimensions of 4"×8". Other finishing activities can include sanding, edge profiling, marking with grade stamps, grading for quality, stacking into units, sealing, labeling, strapping and packaging.

It is common for OSB panels to be manufactured by use of PMDI (polymeric methylene diphenyldiisocyanate) as a core-layer adhesive and PF (phenol/formaldehyde) resin as a surface layer adhesive. The PMDI is relatively expensive and it bonds to metal press platens. Thus, PMDI is not usually used as a surface layer adhesive, but it is associated with significantly improved water absorption rate when the resulting OSB is exposed to precipitation during the construction process. The PMDI has the further advantage of resulting in increased bond strength between adjacent strands, as compared to PF adhesive. Thus, many OSB manufacturers use PMDI as the adhesive in the core layer as opposed to PF resin.

In order to achieve even lower water absorption rate, a few OSB manufacturers have replaced PF adhesive in the surface layer of the panel with PMDI. This results in an OSB panel with exceptional water resistance. A further benefit to this practice is that the panel retains a relatively light-color when it is exposed to water, as opposed to a dark, brown color which is commonly experienced by OSB that is made with a PF adhesive in the surface layer and is subsequently exposed to water. Unfortunately, OSB manufacturers who utilize PMDI in the surface layer must exert significant effort to ensure that the PMDI-treated wooden strands do not bond to the steel platens in the hot-press. Typically, prevention of press sticking is achieved by application of release agents to the top and bottom of the strand mat just prior to hot-pressing. Unfortunately, the release agents (usually tall oil fatty acid soaps or wax emulsions) are relatively expensive and they tend to darken the surface of the OSB, which lessens the value of the panel in the marketplace. The release agents can also accumulate on the press platens and some of them promote corrosion of the press platens. Thus, most OSB manufacturers choose not to use PMDI in the surface layer of the OSB, although it would be beneficial to panel properties.

Thus, there is a need for an alternative surface layer adhesive for OSB and other wood-based composites that achieves a light-colored surface, reduced water absorption rate, and is associated with less sticking to the steel press platens during the manufacturing process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein are adhesives, wood-based composites incorporating the adhesives, and methods of forming wood-based composites using the adhesives. Wood-based composites formed using the adhesives demonstrate an optimal combination of characteristics desirable to the wood-products industry. Specifically, the wood products formed using the adhesive demonstrate (1) a light appearance when wet; (2) relatively low moisture content after soaking in water; (3) relatively little thickness swelling after soaking in water; and (4) minimal adhesion to metal press platens during press-forming of the wood products.

While known adhesives may provide superior performance for certain of these characteristics, no known adhesives provide the optimal combination of the disclosed embodiments. As one example, polymeric methylene diphenyldiisocyanate (PMDI) adhesive provides oriented strandboard (OSB) with less thickness swelling after a water-soak test than OSB formed with the disclosed adhesives, but the PMDI OSB is also far inferior with regard to adhesion to press platens, which affects manufacturing efficiency. Accordingly, the disclosed adhesives, wood-based composites, and methods of forming wood-based composites provide overall superiority in characteristics vital to the manufacturing of wood-based composites, when compared to the present state of the art.

DESCRIPTION OF THE DRAWING

The foregoing aspects and many of the attendant advantages of this invention will become more readily appreciated as the same become better understood by reference to the following detailed description, when taken in conjunction with the accompanying FIGURE, which illustrates experimental results related to the lap shear strength of adhesive bonding between wood and metal for a variety of adhesives, including adhesives according to the disclosed embodiments.

DETAILED DESCRIPTION

Disclosed herein are adhesives, wood-based composites incorporating the adhesives, and methods of forming wood-based composites using the adhesives. Wood-based composites (also referred to herein as "wood products") formed using the adhesives demonstrate an optimal combination of characteristics desirable to the wood products industry. Specifically, the wood products formed using the adhesive demonstrate (1) a light appearance when wet; (2) relatively low moisture content after soaking in water; (3) relatively little thickness swelling after soaking in water; and (4) minimal adhesion to metal press platens during press-forming of the wood products.

While known adhesives may provide superior performance for certain of these characteristics, no known adhesives provide the optimal combination of the disclosed embodiments. As one example, PMDI provides oriented strandboard (OSB) with less thickness swelling after a water-soak test than the disclosed embodiments (see, Table 7), but also is far inferior with regard to adhesion to press platens (see, FIGURE). While OSB is used as an exemplary wood-based composite throughout this disclosure, it will be appreciated that adhesives of the type disclosed can be used to form any wood-based composite known to those of skill in the art.

Adhesive Emulsions

In one aspect, an adhesive emulsion is provided. In one embodiment, the adhesive emulsion includes:

(a) a continuous phase, comprising an aqueous, alkaline solution comprising a melamine/urea/formaldehyde resin; and (b) a dispersed phase, comprising a multifunctional aromatic isocyanate component;

wherein the aqueous, alkaline solution comprising the melamine/urea/formaldehyde resin has a percent solids content of about 1.0% to about 90.0%, and wherein the melamine/urea/formaldehyde resin and the multifunctional aromatic isocyanate component are present in a ratio of about 92:8 to about 40:60 on a solids mass basis. As used herein, the term "about" indicates that a defined value can be modified by greater than or less than 5%.

The adhesive emulsion comprises a continuous phase and a dispersed phase. The continuous phase comprises at least an aqueous, alkaline solution. The aqueous, alkaline solution comprises a melamine/urea/formaldehyde ("MUF") resin. In one embodiment, the melamine/urea/formaldehyde resin is a condensation polymer derived from melamine, urea, and formaldehyde.

The properties of wood products formed using the adhesive emulsion can be modified based on the relative amounts of each component of the MUF resin.

Any composition of the MUF resin can be used in the disclosed embodiments. With regard to melamine, in one embodiment the melamine/urea/formaldehyde resin comprises a melamine-based component that is 5.0% or greater of the solids mass of the MUF resin. In one embodiment the melamine/urea/formaldehyde resin comprises a melamine-based component that is 2.0% to 50.0% of the solids mass. In one embodiment the melamine/urea/formaldehyde resin comprises a melamine-based component that is 5.0% to 30.0% of the solids mass. In one embodiment the melamine/urea/formaldehyde resin comprises a melamine-based component that is 7.0% to 20.0% of the solids mass.

With regard to urea, in one embodiment the melamine/urea/formaldehyde resin comprises a urea-based component that is 5.0% or greater of the solids mass of the MUF resin. In one embodiment the melamine/urea/formaldehyde resin comprises a urea-based component that is 10.0% to 80% of the solids mass. In one embodiment the melamine/urea/formaldehyde resin comprises a urea-based component that is 20.0% to 70.0% of the solids mass. In one embodiment the melamine/urea/formaldehyde resin comprises a urea-based component that is 30.0% to 60.0% of the solids mass.

With regard to formaldehyde, in one embodiment the melamine/urea/formaldehyde resin comprises a formaldehyde-based component that is 30.0% or greater of the solids mass of the MUF resin. In one embodiment the melamine/urea/formaldehyde resin comprises a formaldehyde-based component that is 10.0% to 50.0% of the solids mass. In one embodiment the melamine/urea/formaldehyde resin comprises a formaldehyde-based component that is 15% to 45% of the solids mass. In one embodiment the melamine/urea/formaldehyde resin comprises a formaldehyde-based component that is 20.0% to 40.0% of the solids mass.

In certain embodiments, the aqueous, alkaline solution comprising a melamine/urea/formaldehyde resin has a pH of about 7.5-11. In one embodiment, the aqueous, alkaline solution comprising a melamine/urea/formaldehyde resin has a pH of about 8.0-10.0. In one embodiment, the aqueous, alkaline solution comprising a melamine/urea/formaldehyde resin has a pH of about 8.5-9.5.

In order to achieve the desired pH value for the aqueous, alkaline solution comprising a melamine/urea/formaldehyde resin, in one embodiment the aqueous, alkaline solution comprising the melamine/urea/formaldehyde resin further comprises an alkaline component. Alkaline components suitable for use in the disclosed embodiments include sodium hydroxide, potassium hydroxide, ammonium hydroxide, or organic amines, such as triethanolamine.

The MUF resin can be incorporated into the aqueous, alkaline solution at any amount that allows for the adhesive emulsion to form (i.e., exist as an emulsion). The MUF resin is solvated (i.e., dissolved) in the aqueous, alkaline solution. In one embodiment, the aqueous, alkaline solution comprising the melamine/urea/formaldehyde resin has a percent solids content of about 1.0% to 90.0%. In one embodiment, the aqueous, alkaline solution comprising the melamine/urea/formaldehyde resin has a percent solids content of about 40.0% to 70.0%.

Representative commercial examples of the aqueous, alkaline solution comprising a melamine/urea/formaldehyde resin include Casco Resin MUF M08PC-T and M20PC-T (Momentive Specialty Chemicals, Louisville, Ky.), and 401W67 (Georgia-Pacific Chemicals, LLC, Atlanta, Ga.).

The adhesive emulsion may further include an additive selected from the group consisting of surfactants, diluents, viscosifying agents, colorants, preservatives, formaldehyde scavengers, and combinations thereof. Such additives would comprise a minority of the emulsion and may be contained within the continuous phase or the dispersed phase. These additives can be used to improve the performance or processing characteristics of the adhesive emulsion or wood product formed therefrom.

One unique aspect of the adhesive emulsion is that the continuous phase and the dispersed phase can be selected in such a way that no catalyst is needed to facilitate the reaction between the phases to solidify the adhesive. Accordingly, in one embodiment, the adhesive emulsion contains no catalyst.

The dispersed phase comprises a multifunctional aromatic isocyanate component that is reactive with the MUF resin of the continuous phase. In one embodiment, the multifunctional aromatic isocyanate component comprises PMDI (polymeric methylene diphenyldiisocyanate, which is typically a mixture of MDI and MDI oligomers, and 1,5'-naphthalenediisocyanate); toluene 2,4-diisocyanate, toluene 2,6-diisocyanate, mixtures of toluene 2,4-diisocyanate and toluene 2,6-diisocyanate (TDI), 2,4'-methylene bis(phenylisocyanate), 4,4'-methylene bis(phenylisocyanate) (MDI), and combinations thereof. Manufacturers of multifunctional aromatic isocyanates include BASF Corporation (Wyandotte, Mich.), Huntsman Corporation (The Woodlands, Tex.), The Dow Chemical Company (Midland, Mich.), and Bayer Corporation (Pittsburgh, Pa.).

The dispersed phase may include components besides the multifunctional aromatic isocyanate component. However, in one embodiment the dispersed phase consists essentially of the multifunctional aromatic isocyanate component.

In one embodiment the ratio of the MUF resin to the multifunctional aromatic isocyanate is about 92:8 to 40:60 on a solids mass basis. As the MUF resin portion increases, a wood-based composite formed from the adhesive emulsion becomes less likely to stick to metal press platens. Relatively higher MUF resin also creates wood-based composites with a higher water absorption rate. As the isocyanate level increases, a wood-based composite formed from the adhesive emulsion becomes more likely to stick to metal press platens and wood-based composites formed from the adhesive emulsion have a lower water absorption rate.

The relative proportions of the two components also affect the pot life of the resin. The closer the MUF emulsion to isocyanate mass ratio gets to 1:1, the faster the adhesive cures.

The "solids mass" of an MUF resin is determined by loading a small weighing pan with about 1-3 g of wet resin sample and measuring this loaded mass to about four decimal places. The loaded pan (usually replicated) is transferred into an oven that is maintained at a temperature of about 125° C. for a period of about 3.5 hours. The loaded pans are then removed from the oven and weighed on an analytical balance in order to determine the mass of resin residue. The percent "solids mass" of the resin is then calculated by the following equation:

Percent Solids Mass of Resin=(100%)(wet resin mass−dry resin mass)/(wet resin mass)

In one embodiment the aqueous, alkaline solution comprising the melamine/urea/formaldehyde resin is present in about 38.0-93.0 parts on a solids mass basis and the multifunctional aromatic isocyanate component is present in about 7.0-62.0 parts on a solids mass basis. In one embodiment the aqueous, alkaline solution comprising the melamine/urea/formaldehyde resin is present in about 45.0-80.0 parts on a solids mass basis and the multifunctional aromatic isocyanate component is present in about 20.0-55.0 parts on a solids mass basis. In one embodiment the aqueous, alkaline solution comprising the melamine/urea/formaldehyde resin is present in about 50.0-65.0 parts on a solids mass basis and the multifunctional aromatic isocyanate component is present in about 35.0-50.0 parts on a solids mass basis.

The adhesive emulsion can prepared by mixing the aqueous, alkaline melamine/urea/formaldehyde resin with the multifunctional aromatic isocyanate component at the desired ratio of MUF resin to multifunctional aromatic isocyanate component. This can be accomplished by use of multi-component atomizers, such as those made by Northern Industrial Distributing Incorporated (Bemidji, Minn.), or proportional mixing machines such as those made by The Willamette Valley Company (Eugene, Oreg.). Alternatively, the components could be mixed in the desired ratio with a simple in-line static mix tube. In some cases the mixture could be prepared in a small mix tank as long as the mixture was utilized relatively quickly.

Upon initially mixing the adhesive exists as an emulsion in which the dispersed phase is dispersed within the continuous phase. This emulsion is surprisingly stable and low in viscosity for a period of time that is sufficient for the adhesive emulsion to be applied to wooden elements in order to form a wood-based composite. Although not wishing to be bound by any particular theory, it is hypothesized that as the emulsion ages, the isocyanate reacts with methylol groups on the melamine/urea/formaldehyde resin to form polyurethanes. Other reactions, including the reaction of the isocyanates with water to form polyureas, are also anticipated.

The pot-life of the adhesive emulsion depends on the mix ratio. Lower levels of isocyanate generally result in longer pot-life. The pot-life of the adhesive emulsion can be less than 15 minutes when the isocyanate component is greater than about 50.0% on a solids mass basis, while the pot-life can be in excess of 60 minutes when the isocyanate is less than about 10.0% on a solids mass basis.

In another aspect, adhesive compositions are provided that include a suspended phase comprising a resin powder and a continuous phase comprising a multifunctional aromatic isocyanate component. The components of these adhesive compositions are similar in nature to those of the adhesive emulsions provided herein. However, these adhesive compositions have a suspended phase that is a resin powder.

The disclosed adhesive compositions are alternative formulations compared to the adhesive emulsions but provide the same improved characteristics when applied to the manufacture of wood-based composites. These formulations can be used in place of the adhesive emulsions. Mixing a powder into a liquid and then applying the adhesive is different than mixing two liquids. Therefore, the adhesive compositions provide an alternative mechanism for formulating an adhesive that eliminates the sometimes burdensome liquid-liquid mixing process required for the adhesive emulsions. For example, mixing the powder into a resin before applying may be easier than using dual component mix heads or in line static mixers to form adhesive emulsions.

In one embodiment, an adhesive composition is provided that includes;

(a) a suspended phase comprising melamine/urea/formaldehyde resin powder; and (b) a continuous phase comprising a multifunctional aromatic isocyanate component;

wherein the melamine/urea/formaldehyde resin powder and the multifunctional aromatic isocyanate component are present in a ratio of about 1:99 to 55:45 on a solids mass basis.

In another embodiment, an adhesive composition is provided that includes;

(a) a suspended phase comprising a melamine/formaldehyde resin powder; and (b) a continuous phase comprising a multifunctional aromatic isocyanate component;

wherein the melamine/formaldehyde resin powder and the multifunctional aromatic isocyanate component are present in a ratio of about 1:99 to 55:45 on a solids mass basis.

The adhesive compositions can be formed by simply mixing the MUF or MF resin powder into the continuous phase in the required proportions.

Wood-Based Composites

In another aspect, a wood-based composite is provided. In one embodiment the wood-based composite includes wooden elements adhered together by a polyurethane polymer formed by the reaction of the continuous phase and the dispersed phase of an adhesive emulsion according to the embodiments disclosed herein.

The wood-based composite can be formed using techniques and components known to those of skill in the art.

In one embodiment, the wooden elements are selected from the group consisting of strands, flakes, particles, fibers, veneer, and combinations thereof. As an example, these wooden elements can be cut from logs or subsections of logs based on aspen, poplar, fir, pine, oak, hemlock, maple, walnut, or elm.

In one embodiment, the wood-based composite is of a type selected from the group consisting of oriented strandboard, particleboard, medium-density fiberboard, oriented strand lumber, parallel strand lumber, laminated veneer lumber, laminated strand lumber, and plywood.

The Examples below disclosed the formation of OSB using the adhesive emulsions according to the disclosed embodiments. In the Examples, two-part OSB is formed, with a core layer and a surface layer. Such two-part OSB generally are known to those of skill in the art. In the disclosed embodiments, the adhesive emulsion is applied to the surface layer of the OSB so as to facilitate removal of the OSB from the hot press by reducing adhesion of the wood to the press platens. Accordingly, in one embodiment a wood-based composite is provided having at least a core layer and a surface layer, wherein the surface layer is treated with the adhesive emulsion and the core layer is treated with an adhesive that is not the adhesive emulsion. In other embodiments a wood-based composite is formed that is a single layer that is treated with the adhesive emulsion. In yet another embodiment, a multi-layer wood-based composite is provided in which two or more layers are treated with the adhesive emulsion.

In one embodiment, the wood-based composite further includes an additive selected from the group consisting of a wax, a second adhesive, a preservative, a fire retardant, a coating, a sealant, a colorant, a marking, and combinations thereof.

In another aspect, a method of forming a wood-based composite is provided. In one embodiment the method includes:

(a) coating a plurality of wooden elements with an adhesive emulsion as disclosed herein to provide coated wooden elements;

(b) forming the coated wooden elements into a mat;

(c) applying pressure to the mat with a press; and (d) heating the mat to form the wood-based composite.

Methods of forming wood-based composites are generally known to those of skill in the art. In the present aspect, wood-based composites are made by treating wooden elements with an adhesive emulsion according to the disclosed embodiments. The adhesive-treated wooden elements are then formed into a layered mat, which is then subjected to heat and pressure (usually in a hot-press) to form a composite, such as OSB, particleboard, medium density fiberboard, oriented strand lumber, parallel strand lumber, laminated veneer lumber or plywood. In these composites additional additives such as waxes, other adhesives, preservatives, fire retardants, coatings, sealants, colorants, markings or other can be incorporated into the composite.

In one embodiment the adhesive emulsion is applied at level of about 1-15%, based on the dry mass of the wooden elements.

The step of forming the coated wooden elements into a mat may comprise forming two- or multi-layer mats that include wooden elements coated with different adhesives, wherein at least one layer comprises wooden elements coated with the adhesive emulsion.

The press typically used to form a wood-based composite provides both pressure and heat (a "hot press"). The platens of the press are made from steel, which is known as a material to which prior art adhesives (e.g., pure PMDI) are known to adhere. When forming wood-based composites according to the present method, the steps of applying pressure and heating the mat to form the wood-based composite will experience significantly less adhesion between the press platens and the formed wood-based composite due to the composition of the adhesive emulsion and the resulting adhesive formed upon heating in the press. The Examples illustrate this effect in detail.

The following examples are intended to illustrate, not limit, the disclosed embodiments.

EXAMPLES

Example 1

Conventional Adhesive OSB

A conventional surface layer phenol/formaldehyde liquid adhesive, known as 155C42, was manufactured by the Georgia-Pacific Resins Corporation (Atlanta, Ga.).

Oriented strand board (OSB) that was representative of conventional OSB was produced on a laboratory-scale in the following manner. Wooden strands (25-45 mils thick, 0.25-1.5" wide, 0.25-5.0" long, aspen and poplar species) designated as "core-layer strands" were dried to a moisture content of about 2.5-3.5% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A slack wax, known as 431B (manufactured by the International Group Incorporated in Toronto, Ontario, Canada), was heated to a temperature of 225° F. and then sprayed onto the wooden strands at a loading level of 0.5% based on the dry mass of the wood. An isocyanate-based bonding resin, known as Lupranate M20FB (manufactured by the BASF Corporation in Wyandotte, Mich.), was then sprayed onto the strands at a loading level of 4.0% based on the dry mass of the wood. The treated core-layer strands were then removed from the blender.

Additional wooden strands (25-45 mils thick, 0.25-1.5" wide, 0.25-5.0" long, aspen and poplar species) designated as "core-layer strands" were dried to a moisture content of about 1.5-2.5% and were then loaded into the blender compartment. A slack wax, known as 431B ((manufactured by the International Group Incorporated in Toronto, Canada), was heated to a temperature of 225° F. and then sprayed onto the wooden strands at a loading level of 0.5% based on the dry mass of the wood. A phenol-formaldehyde based bonding resin, known as 155C42 (manufactured by the Georgia Pacific Resins Corporation in Decatur, Ga.), was then sprayed onto the strands at a loading level of 2.0% based on the solids content of the resin and the dry mass of the wood. The treated core-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one major axis of the mat, while the strands in the core layer were oriented in a direction that was generally parallel to the other major axis of the mat. The mass of each of the four layers was about 1070-1085 g. The thickness of the mat was about 5".

The mat, as well as the caul plate and screen that were supporting the mat, were then transferred onto the bottom platen of an open hot-press. The top and bottom platens were maintained at a surface temperature of 420° F. A control system was immediately activated in order to begin closing the gap between the top and bottom platens until the distance between them was 0.719". The time required to achieve this compression process was about 60 s. The maximum pressure exerted on the mat was about 500-650 psi. The gap between the platens was maintained at 0.719" for a period of 190 s and was then increased to 0.749" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. One test specimen (8"×16") was cut from each conditioned laboratory panel. Each test specimen was weighed and measured for thickness at five marked locations along the center of the specimen. Each test specimen was then submerged under 1" of water (T=20° C.) for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen. Based on these measurements calculations were made regarding the moisture content and the thickness swell that occurred during the water-soak procedure. The results are presented in Table 1. In general:

Moisture Content=100%(water mass in the specimen)/(dry mass of the specimen)

Wet Thickness Swell=100%(thickness after soaking for two days−initial thickness)/(initial thickness)

Redry Thickness Swell=100%(thickness after redry−initial thickness)/(initial thickness)

TABLE 1

Test values for OSB made with PF resin in the surface layer

| SAMPLE | MOISTURE CONTENT (%) AFTER SOAKING FOR TWO DAYS | THICKNESS SWELL (%) AFTER SOAKING FOR TWO DAYS & THEN DRYING FOR TWO DAYS |
| --- | --- | --- |
| 1 | 34.6 | 14.6 |
| 2 | 33.1 | 13.8 |
| 3 | 32.5 | 15.0 |
| AVERAGE | 33.4 | 14.5 |

Example 2

Conventional Premium Adhesive OSB

Oriented strand board (OSB) that was representative of conventional, premium OSB was produced on a laboratory-scale in the following manner. Wooden strands (25-45 mils thick, 0.25-1.5" wide, 0.25-5.0" long, aspen and poplar species) designated as "core-layer strands" were dried to a moisture content of about 2.5-3.5% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A slack wax, known as 431B ((manufactured by the International Group Incorporated in Toronto, Ontario, Canada), was heated to a temperature of 225° F. and then sprayed onto the wooden strands at a loading level of 0.5% based on the dry mass of the wood. An isocyanate-based bonding resin, known as Lupranate M20FB (manufactured by the BASF Corporation in Wyandotte, Mich.), was then sprayed onto the strands at a loading level of 4.0% based on the dry mass of the wood. The treated core-layer strands were then removed from the blender.

Additional wooden strands (25-45 mils thick, 0.25-1.5" wide, 0.25-5.0" long, aspen and poplar species) designated as "core-layer strands" were dried to a moisture content of about 1.5-2.5% and were then loaded into the blender compartment. A slack wax, known as 431B (manufactured by the International Group Incorporated in Toronto, Ontario, Canada), was heated to a temperature of 225° F. and then sprayed onto the wooden strands at a loading level of 0.5% based on the dry mass of the wood. An isocyanate-based bonding resin, known as Lupranate M20FB (manufactured by the BASF Corporation in Wyandotte, Mich.), was then sprayed onto the strands at a loading level of 2.0% based on the solids content of the resin and the dry mass of the wood. The treated core-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was generally parallel to the other major axis of the mat. The mass of each of the four layers was about 1070-1085 g. The thickness of the mat was about 5".

The mat, as well as the caul plate and screen that were supporting the mat, were then transferred onto the bottom platen of an open hot-press. The top and bottom platens were maintained at a surface temperature of 420° F. A control system was immediately activated in order to begin closing the gap between the top and bottom platens until the distance between them was 0.719". The time required to achieve this compression process was about 60 s. The maximum pressure exerted on the mat was about 500-650 psi. The gap between the platens was maintained at 0.719" for a period of 190 s and was then increased to 0.749" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. One test specimen (8"×16") was cut from each conditioned laboratory panel. Each test specimen was weighed and measured for thickness at five marked locations along the center of the specimen. Each test specimen was then submerged under 1" of water (T=20° C.) for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen. Based on these measurements calculations were made regarding the moisture content and the thickness swell that occurred during the water-soak procedure. The results are presented in Table 2. In general:

Moisture Content=100%(water mass in the specimen)/(dry mass of the specimen)

Wet Thickness Swell=100%(thickness after soaking for two days−initial thickness)/(initial thickness)

Swell=100%(thickness after redry−initial thickness)/(initial thickness)

TABLE 2

Test values for OSB made with PMDI only in the surface layer

| SAMPLE | MOISTURE CONTENT (%) AFTER SOAKING FOR TWO DAYS | THICKNESS SWELL (%) AFTER SOAKING FOR TWO DAYS & THEN DRYING FOR TWO DAYS |
|---|---|---|
| 1 | 14.7 | 6.1 |
| 2 | 16.8 | 5.1 |
| 3 | 16.7 | 7.2 |
| AVERAGE | 16.1 | 6.1 |

Example 3

MUF Adhesive OSB

Oriented strand board (OSB) that was representative of non-conventional, OSB was produced on a laboratory-scale in the following manner. Wooden strands (25-45 mils thick, 0.25-1.5" wide, 0.25-5.0" long, aspen and poplar species) designated as "core-layer strands" were dried to a moisture content of about 2.5-3.5% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A slack wax, known as 431B ((manufactured by the International Group Incorporated in Toronto, Ontario, Canada), was heated to a temperature of 225° F. and then sprayed onto the wooden strands at a loading level of 0.5% based on the dry mass of the wood. An isocyanate-based bonding resin, known as Lupranate M20FB (manufactured by the BASF Corporation in Wyandotte, Mich.), was then sprayed onto the strands at a loading level of 4.0% based on the dry mass of the wood. The treated core-layer strands were then removed from the blender.

Additional wooden strands (25-45 mils thick, 0.25-1.5" wide, 0.25-5.0" long, aspen and poplar species) designated as "core-layer strands" were dried to a moisture content of about 1.5-2.5% and were then loaded into the blender compartment. A slack wax, known as 431B ((manufactured by the International Group Incorporated in Toronto, Ontario, Canada), was heated to a temperature of 225° F. and then sprayed onto the wooden strands at a loading level of 0.5% based on the dry mass of the wood. A melamine/urea/formaldehyde bonding resin, known as 401W67 (pH=8.15) (manufactured by the Georgia-Pacific Resins Corporation in Atlanta, Ga.), was then sprayed onto the strands at a loading level of 2.0% based on the solids content of the resin and the dry mass of the wood. The treated core-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was generally parallel to the other major axis of the mat. The mass of each of the four layers was about 1070-1085 g. The thickness of the mat was about 5".

The mat, as well as the caul plate and screen that were supporting the mat, were then transferred onto the bottom platen of an open hot-press. The top and bottom platens were maintained at a surface temperature of 420° F. A control system was immediately activated in order to begin closing the gap between the top and bottom platens until the distance between them was 0.719". The time required to achieve this compression process was about 60 s. The maximum pressure exerted on the mat was about 500-650 psi. The gap between the platens was maintained at 0.719" for a period of 190 s and was then increased to 0.749" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. One test specimen (8"×16") was cut from each conditioned laboratory panel. Each test specimen was weighed and measured for thickness at five marked locations along the center of the specimen. Each test specimen was then submerged under 1" of water (T=20° C.) for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen. Based on these measurements calculations were made regarding the moisture content and the thickness swell that occurred during the water-soak procedure. The results are presented in Table 3. In general:

Moisture Content=100%(water mass in the specimen)/(dry mass of the specimen)

Wet Thickness Swell=100%(thickness after soaking for two days−initial thickness)/(initial thickness)

Redry Thickness Swell=100%(thickness after redry−initial thickness)/(initial thickness)

TABLE 3

Test values for OSB made with MUF in the surface layer

| SAMPLE | MOISTURE CONTENT (%) AFTER SOAKING FOR TWO DAYS | THICKNESS SWELL (%) AFTER SOAKING FOR TWO DAYS & THEN DRYING FOR TWO DAYS |
| --- | --- | --- |
| 1 | 29.6 | 15.9 |
| 2 | 26.8 | 14.0 |
| 3 | 26.1 | 14.2 |
| AVERAGE | 27.5 | 14.7 |

Example 4

Exemplary OSB Formed with Adhesive Emulsion

Oriented strand board (OSB) that was representative of non-conventional, OSB was produced on a laboratory-scale in the following manner. Wooden strands (25-45 mils thick, 0.25-1.5" wide, 0.25-5.0" long, aspen and poplar species) designated as "core-layer strands" were dried to a moisture content of about 2.5-3.5% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A slack wax, known as 431B (manufactured by the International Group Incorporated in Toronto, Ontario, Canada), was heated to a temperature of 225° F. and then sprayed onto the wooden strands at a loading level of 0.5% based on the dry mass of the wood. An isocyanate-based bonding resin, known as Lupranate M20FB (manufactured by the BASF Corporation in Wyandotte, Mich.), was then sprayed onto the strands at a loading level of 4.0% based on the dry mass of the wood. The treated core-layer strands were then removed from the blender.

Additional wooden strands (25-45 mils thick, 0.25-1.5" wide, 0.25-5.0" long, aspen and poplar species) designated as "core-layer strands" were dried to a moisture content of about 1.5-2.5% and were then loaded into the blender compartment. A slack wax, known as 431B (manufactured by the International Group Incorporated in Toronto, Ontario, Canada), was heated to a temperature of 225° F. and then sprayed onto the wooden strands at a loading level of 0.5% based on the dry mass of the wood. A melamine/urea/formaldehyde bonding resin, known as 401W67 (pH=8.15) (manufactured by the Georgia-Pacific Resins Corporation in Atlanta, Ga.), was mixed with PMDI (Lupranate M20FB) at a ratio of 90.0:10.0 on a wet mass basis. On a solids basis this ratio was MUF (86.1 parts by mass) to PMDI (13.9 parts by mass). This mixture existed as a low viscosity emulsion, which was sprayed onto the strands at a loading level of 2.0% based on the solids content of the resin and the dry mass of the wood. The application of the mixed adhesive formulation was completed within about 20 minutes of preparation. The treated core-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the These formulations can be used in place of the emulsions. Mixing a powder into a liquid and then applying the adhesive is different than mixing two liquids. Someone could try to use this method to get around the patent or just decide that mixing the powder into the resin before applying is easier than using dual component mix heads or in line static mixers layer were oriented in a direction that was generally parallel to the other major axis of the mat. The mass of each of the four layers was about 1070-1085 g. The thickness of the mat was about 5".

The mat, as well as the caul plate and screen that were supporting the mat, were then transferred onto the bottom platen of an open hot-press. The top and bottom platens were maintained at a surface temperature of 420° F. A control system was immediately activated in order to begin closing the gap between the top and bottom platens until the distance between them was 0.719". The time required to achieve this compression process was about 60 s. The maximum pressure exerted on the mat was about 500-650 psi. The gap between the platens was maintained at 0.719" for a period of 190 s and was then increased to 0.749" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. One test specimen (8"×16") was cut from each conditioned laboratory panel. Each test specimen was weighed and measured for thickness at five marked locations along the center of the specimen. Each test specimen was then submerged under 1" of water (T=20° C.) for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen. Based on these measurements calculations were made regarding the moisture content and the thickness swell that occurred during the water-soak procedure. The results are presented in Table 4. In general:

Moisture Content=100%(water mass in the specimen)/(dry mass of the specimen)

Wet Thickness Swell=100%(thickness after soaking for two days−initial thickness)/(initial thickness)

Redry Thickness Swell=100%(thickness after redry−initial thickness)/(initial thickness)

TABLE 4

Test values for OSB made with a MUF (86.1 parts by dry mass) & PMDI (13.9 parts by mass) mixed adhesive composition in the surface layer

| SAMPLE | MOISTURE CONTENT (%) AFTER SOAKING FOR TWO DAYS | THICKNESS SWELL (%) AFTER SOAKING FOR TWO DAYS & THEN DRYING FOR TWO DAYS |
|---|---|---|
| 1 | 24.5 | 12.1 |
| 2 | 24.5 | 11.7 |
| 3 | 33.1 | 14.0 |
| AVERAGE | 27.4 | 12.6 |

Example 5

Exemplary OSB Formed with Adhesive Emulsion

Oriented strand board (OSB) that was representative of non-conventional, OSB was produced on a laboratory-scale in the following manner. Wooden strands (25-45 mils thick, 0.25-1.5" wide, 0.25-5.0" long, aspen and poplar species) designated as "core-layer strands" were dried to a moisture content of about 2.5-3.5% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A slack wax, known as 431B (manufactured by the International Group Incorporated in Toronto, Ontario, Canada), was heated to a temperature of 225° F. and then sprayed onto the wooden strands at a loading level of 0.5% based on the dry mass of the wood. An isocyanate-based bonding resin, known as Lupranate M20FB (manufactured by the BASF Corporation in Wyandotte, Mich.), was then sprayed onto the strands at a loading level of 4.0% based on the dry mass of the wood. The treated core-layer strands were then removed from the blender.

Additional wooden strands (25-45 mils thick, 0.25-1.5" wide, 0.25-5.0" long, aspen and poplar species) designated as "core-layer strands" were dried to a moisture content of about 1.5-2.5% and were then loaded into the blender compartment. A slack wax, known as 431B (manufactured by the International Group Incorporated in Toronto, Ontario, Canada), was heated to a temperature of 225° F. and then sprayed onto the wooden strands at a loading level of 0.5% based on the dry mass of the wood. A melamine/urea/formaldehyde bonding resin, known as 401W67 (pH=8.15) (manufactured by the Georgia-Pacific Resins Corporation in Atlanta, Ga.), was mixed with PMDI (Lupranate M20FB) at a ratio of 80.0:20.0 on a wet mass basis. On a solids basis this ratio was MUF (72.2 parts by mass) to PMDI (27.8 parts by mass). This mixture existed as a low viscosity emulsion, which was sprayed onto the strands at a loading level of 2.0% based on the solids content of the resin and the dry mass of the wood. The application of the mixed adhesive formulation was completed within about 20 minutes of preparation. The treated core-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was generally parallel to the other major axis of the mat. The mass of each of the four layers was about 1070-1085 g. The thickness of the mat was about 5".

The mat, as well as the caul plate and screen that were supporting the mat, were then transferred onto the bottom platen of an open hot-press. The top and bottom platens were maintained at a surface temperature of 420° F. A control system was immediately activated in order to begin closing the gap between the top and bottom platens until the distance between them was 0.719". The time required to achieve this compression process was about 60 s. The maximum pressure exerted on the mat was about 500-650 psi. The gap between the platens was maintained at 0.719" for a period of 190 s and was then increased to 0.749" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. One test specimen (8"×16") was cut from each conditioned laboratory panel. Each test specimen was weighed and measured for thickness at five marked locations along the center of the specimen. Each test specimen was then submerged under 1" of water (T=20° C.) for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen. Based on these measurements calculations were made regarding the moisture content and the thickness swell that occurred during the water-soak procedure. The results are presented in Table 5. In general:

Moisture Content=100%(water mass in the specimen)/(dry mass of the specimen)

Wet Thickness Swell=100%(thickness after soaking for two days−initial thickness)/(initial thickness)

Redry Thickness Swell=100%(thickness after redry−initial thickness)/(initial thickness)

TABLE 5

Test values for OSB made with a MUF (72.2 parts by dry mass) & PMDI (27.8 parts by mass) mixed adhesive composition in the surface layer

| SAMPLE | MOISTURE CONTENT (%) AFTER SOAKING FOR TWO DAYS | THICKNESS SWELL (%) AFTER SOAKING FOR TWO DAYS & THEN DRYING FOR TWO DAYS |
| --- | --- | --- |
| 1 | 25.0 | 10.8 |
| 2 | 24.3 | 11.1 |
| 3 | 23.1 | 14.5 |
| AVERAGE | 24.1 | 12.1 |

Example 6

Exemplary OSB Formed with Adhesive Emulsion

Oriented strand board (OSB) that was representative of non-conventional, OSB was produced on a laboratory-scale in the following manner. Wooden strands (25-45 mils thick, 0.25-1.5" wide, 0.25-5.0" long, aspen and poplar species) designated as "core-layer strands" were dried to a moisture content of about 2.5-3.5% and were then transferred into a front-load, cylindrical-shaped "blender" compartment (2' depth, 6' diameter). The axis of rotation of the blender was parallel to the laboratory floor. The rotating interior surface of the blender compartment was equipped with pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A slack wax, known as 431B (manufactured by the International Group Incorporated in Toronto, Ontario, Canada), was heated to a temperature of 225° F. and then sprayed onto the wooden strands at a loading level of 0.5% based on the dry mass of the wood. An isocyanate-based bonding resin, known as Lupranate M20FB (manufactured by the BASF Corporation in Wyandotte, Mich.), was then sprayed onto the strands at a loading level of 4.0% based on the dry mass of the wood. The treated core-layer strands were then removed from the blender.

Additional wooden strands (25-45 mils thick, 0.25-1.5" wide, 0.25-5.0" long, aspen and poplar species) designated as "core-layer strands" were dried to a moisture content of about 1.5-2.5% and were then loaded into the blender compartment. A slack wax, known as 431B (manufactured by the International Group Incorporated in Toronto, Ontario, Canada), was heated to a temperature of 225° F. and then sprayed onto the wooden strands at a loading level of 0.5% based on the dry mass of the wood. A melamine/urea/formaldehyde bonding resin, known as 401W67 (pH=8.15) (manufactured by the Georgia-Pacific Resins Corporation in Atlanta, Ga.), was mixed with PMDI (Lupranate M20FB) at a ratio of 70.0:30.0 on a wet mass basis. On a solids basis this ratio was MUF (58.3 parts by mass) to PMDI (41.7 parts by mass). This mixture existed as a low viscosity emulsion, which was sprayed onto the strands at a loading level of 2.0% based on the solids content of the resin and the dry mass of the wood. The application of the mixed adhesive formulation was completed within about 20 minutes of preparation. The treated core-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was generally parallel to the other major axis of the mat. The mass of each of the four layers was about 1070-1085 g. The thickness of the mat was about 5".

The mat, as well as the caul plate and screen that were supporting the mat, were then transferred onto the bottom platen of an open hot-press. The top and bottom platens were maintained at a surface temperature of 420° F. A control system was immediately activated in order to begin closing the gap between the top and bottom platens until the distance between them was 0.719". The time required to achieve this compression process was about 60 s. The maximum pressure exerted on the mat was about 500-650 psi. The gap between the platens was maintained at 0.719" for a period of 190 s and was then increased to 0.749" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. One test specimen (8"×16") was cut from each conditioned laboratory panel. Each test specimen was weighed and measured for thickness at five marked locations along the center of the specimen. Each test specimen was then submerged under 1" of water (T=20° C.) for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen. Based on these measurements calculations were made regarding the moisture content and the thickness swell that occurred during the water-soak procedure. The results are presented in Table 6. In general:

Moisture Content=100%(water mass in the specimen)/(dry mass of the specimen)

Wet Thickness Swell=100%(thickness after soaking for two days−initial thickness)/(initial thickness)

Redry Thickness Swell=100%(thickness after redry−initial thickness)/(initial thickness)

TABLE 6

Test values for OSB made with a MUF (58.3 parts by dry mass) & PMDI (41.7 parts by mass) mixed adhesive composition in the surface layer

| SAMPLE | MOISTURE CONTENT (%) AFTER SOAKING FOR TWO DAYS | THICKNESS SWELL (%) AFTER SOAKING FOR TWO DAYS & THEN DRYING FOR TWO DAYS |
| --- | --- | --- |
| 1 | 21.6 | 8.9 |
| 2 | 22.7 | 10.2 |
| 3 | 20.9 | 8.0 |
| AVERAGE | 21.8 | 9.0 |

Example 7

Characterization of Conventional and Exemplary OSB

Laboratory OSB sections (16"×8") described in Examples 1-6 were all submerged under 1" of water (20° C.) for a period of 4 hours. All of the specimens were removed from the water, placed adjacent to each other, and then inspected. The OSB described in Example 1 (with a PF resin in the surface layer) had a relatively dark surface appearance, while the other OSB types described in examples 2-6 had a relatively light surface appearance. The results are summarized in Table 7.

TABLE 7

Summary of test data from Examples 1-6 samples

| EXAMPLE | SURFACE RESIN TYPE | MOISTURE CONTENT (%) AFTER SOAKING FOR TWO DAYS | THICKNESS SWELL (%) AFTER SOAKING FOR TWO DAYS & THEN DRYING FOR TWO DAYS | WET OSB APPEARANCE |
| --- | --- | --- | --- | --- |
| 1 | PF | 33.4 | 14.5 | DARK |
| 2 | PMDI | 16.1 | 6.1 | LIGHT |
| 3 | MUF | 27.5 | 14.7 | LIGHT |
| 4 | MUF (86.1)/PMDI (13.9) | 27.4 | 12.6 | LIGHT |
| 5 | MUF (72.2)/PMDI (27.8) | 24.1 | 12.1 | LIGHT |
| 6 | MUF (58.3)/PMDI (41.7) | 21.8 | 9.0 | LIGHT |

Example 8

Press Platen Adhesion

One desirable benefit of the disclosed compositions is the reduction of adhesion to press platens during formation of a wood product (e.g., OSB). Representative adhesive emulsions of the present disclosure, which contain both MUF and PMDI in the exemplary embodiments, were shown to exhibit reduced adhesion compared to OSB formed using only PMDI.

A lap shear bond testing apparatus was used to measure the bond strength of southern yellow pine strands bonded to an A-36 carbon steel coupon. Adhesive was applied to a wood strand that was previously cut from veneer. The adhesive compositions included 100% PMDI; 100% MUF; 100% PF; and blends of PMDI/MUF according to the present disclosure. The samples were prepared in accordance with the previous examples.

The strand was placed into the heated platen testing apparatus along with an A-36 carbon steel coupon, a common material used for heated press platens used to form wood products (e.g., OSB). The bond area was 25 mm by 20 mm (500 mm$^2$). The apparatus pressed the wood strand and steel coupon together with a force of 60 psi and the press heads heated to 213° C. Pressure and heat were applied for 30 seconds. The press heads were then pulled away from the bonding area. The bond was then broken by pulling the wooden strand and steel coupon in opposite directions. A load cell measured the force required to break each bond. 20 bonds for each adhesive were tested.

The results of the lap shear test are illustrated in the FIGURE. A statistical software package was used to determine the difference in lap shear bond strength at a 95% confidence interval level ("95% CI for the Mean"). Groups with non-overlapping interval bars are significantly different at a 95% confidence level. PMDI showed the most force required to separate, which indicates the most adhesion ("sticking") to the coupon. This is unsurprising, as PMDI is known to adhere to press platens when forming wood products, a problem the present disclosure is meant to address. PMDI/MUF blends, exemplary of the disclosed embodiments, demonstrated reduced adhesion.

While illustrative embodiments have been illustrated and described, it will be appreciated that various changes can be made therein without departing from the spirit and scope of the invention.

The invention claimed is:

1. An adhesive emulsion, comprising:
    (a) a continuous phase, comprising an aqueous, alkaline solution comprising a melamine/urea/formaldehyde resin; and
    (b) a dispersed phase, comprising a multifunctional aromatic isocyanate component;
    wherein the aqueous, alkaline solution comprising the melamine/urea/formaldehyde resin has a percent solids content of about 1.0% to about 90.0%; and
    wherein the melamine/urea/formaldehyde resin and the multifunctional aromatic isocyanate component are present in a ratio of about 92:8 to about 40:60 on a solids mass basis.

2. The adhesive emulsion of claim 1, wherein the aqueous, alkaline solution comprising the melamine/urea/formaldehyde resin has a percent solids content of about 40.0% to about 70.0%.

3. The adhesive emulsion of claim 1, wherein the aqueous, alkaline solution comprising the melamine/urea/formaldehyde resin is present in about 38.0-93.0 parts on a solids mass basis and the multifunctional aromatic isocyanate component is present in about 7.0-62.0 parts on a solids mass basis.

4. The adhesive emulsion of claim 1, wherein the multifunctional aromatic isocyanate component comprises polymeric methylene diphenyldiisocyanate.

5. The adhesive emulsion of claim 1, wherein the melamine/urea/formaldehyde resin comprises a melamine-based component that is about 5.0% or greater of the solids mass of the melamine/urea/formaldehyde resin.

6. The adhesive emulsion of claim 1, wherein the melamine/urea/formaldehyde resin comprises a urea-based component that is about 5.0% or greater of the solids mass of the melamine/urea/formaldehyde resin.

7. The adhesive emulsion of claim 1, wherein the melamine/urea/formaldehyde resin comprises a formaldehyde-based component that is about 30.0% or greater of the solids mass of the melamine/urea/formaldehyde resin.

8. The adhesive emulsion of claim 1, wherein the melamine/urea/formaldehyde resin is a condensation polymer derived from melamine, urea, and formaldehyde.

9. The adhesive emulsion of claim 1, wherein the aqueous, alkaline solution comprising a melamine/urea/formaldehyde resin has a pH of about 7.5-11.

10. The adhesive emulsion of claim 1, wherein the aqueous, alkaline solution comprising the melamine/urea/formaldehyde resin further comprises an alkaline component.

11. The adhesive emulsion of claim 10, wherein the alkaline component is sodium hydroxide.

12. The adhesive emulsion of claim 1, further comprising an additive selected from the group consisting of surfactants, diluents, viscosifying agents, colorants, preservatives, formaldehyde scavengers, and combinations thereof.

13. The adhesive emulsion of claim 1, wherein the adhesive emulsion contains no catalyst of a reaction between the melamine/urea/formaldehyde resin and the multifunctional aromatic isocyanate component.

14. The adhesive emulsion of claim 1, wherein the multifunctional aromatic isocyanate component comprises toluene 2,4-diisocyanate.

15. The adhesive emulsion of claim 1, wherein the multifunctional aromatic isocyanate component comprises toluene 2,6-diisocyanate.

16. The adhesive emulsion of claim 1, wherein the multifunctional aromatic isocyanate component comprises 2,4'-methylene bis(phenylisocyanate).

17. The adhesive emulsion of claim 1, wherein the multifunctional aromatic isocyanate component comprises 4,4'-methylene bis(phenylisocyanate).

18. The adhesive emulsion of claim 1, wherein the aqueous, alkaline solution comprising a melamine/urea/formaldehyde resin has a pH of about 8.0-10.0.

19. The adhesive emulsion of claim 10, wherein the alkaline component is potassium hydroxide.

20. The adhesive emulsion of claim 10, wherein the alkaline component is ammonium hydroxide.

21. The adhesive emulsion of claim 10, wherein the alkaline component is an organic amine.

* * * * *